United States Patent
Wust (10) Patent No.: US 8,485,929 B2
(45) Date of Patent: Jul. 16, 2013

(54) MOTOR VEHICLE POWER TRAIN

(75) Inventor: Bernhard Wust, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 354 days.

(21) Appl. No.: 12/735,901

(22) PCT Filed: Oct. 12, 2009

(86) PCT No.: PCT/EP2009/007323
§ 371 (c)(1),
(2), (4) Date: Oct. 7, 2010

(87) PCT Pub. No.: WO2010/043361
PCT Pub. Date: Apr. 22, 2010

(65) Prior Publication Data
US 2011/0024208 A1    Feb. 3, 2011

(30) Foreign Application Priority Data
Oct. 18, 2008    (DE) .......................... 10 2008 052 288

(51) Int. Cl.
*F16H 3/72* (2006.01)
*B60K 6/26* (2007.10)

(52) U.S. Cl.
USPC ................................... 475/5; 475/73; 475/83

(58) Field of Classification Search
USPC ............. 475/72, 73, 83, 84; 74/730.1, 665 A, 74/665 B, 665 C, 732.1; 60/435, 358; 903/952
See application file for complete search history.

(56) References Cited

U.S. PATENT DOCUMENTS

| 6,656,083 | B2 | 12/2003 | Esaki | |
|---|---|---|---|---|
| 6,668,953 | B1 * | 12/2003 | Reik et al. | 180/53.8 |
| 6,878,092 | B1 * | 4/2005 | Schustek et al. | 477/3 |
| 7,004,136 | B2 * | 2/2006 | Garabello et al. | 123/179.28 |
| 7,547,264 | B2 * | 6/2009 | Usoro | 475/5 |
| 8,328,673 | B2 * | 12/2012 | Smith et al. | 475/5 |
| 2006/0025260 | A1 * | 2/2006 | Klemen et al. | 475/5 |
| 2006/0244263 | A1 * | 11/2006 | Manning | 290/1 R |
| 2007/0049455 | A1 * | 3/2007 | Kuramochi | 477/3 |
| 2007/0213161 | A1 * | 9/2007 | Tabata et al. | 475/5 |
| 2008/0096711 | A1 * | 4/2008 | Smith et al. | 475/5 |
| 2008/0179119 | A1 * | 7/2008 | Grenn et al. | 180/65.2 |
| 2008/0211335 | A1 * | 9/2008 | Abe et al. | 310/103 |
| 2010/0071974 | A1 * | 3/2010 | Akutsu et al. | 180/65.265 |

FOREIGN PATENT DOCUMENTS

| DE | 19858304 A1 | 6/2000 |
|---|---|---|
| DE | 19931963 A1 | 1/2001 |
| DE | 10203259 A1 | 1/2003 |
| EP | 1069310 A3 | 11/2002 |
| EP | 1209016 A3 | 5/2005 |

* cited by examiner

*Primary Examiner* — Sherry Estremsky
*Assistant Examiner* — Lillian Nguyen
(74) *Attorney, Agent, or Firm* — Farjami & Farjami LLP (57) ABSTRACT

A motor vehicle power train includes a main drive engine with an output shaft for driving the drive wheels of the motor vehicle, an electric motor which includes a rotor and a stator, also for driving the drive wheels of the motor vehicle, an automatic transmission, with a plurality of selectively settable drive connections, a transmission input shaft and a transmission output shaft, the rotor of the electric motor being disposed in a drive connection between the output shaft of the main drive engine and the transmission input shaft, and can be disengaged from the output shaft with a clutch, and at least one ancillary unit which can be driven by the main drive engine. The rotor of the electric motor includes an exterior drive having a gearing of friction surface which has a driving connection to the at least one ancillary unit.

20 Claims, 4 Drawing Sheets

| Operating state | ICE | E | AU | C1 | C2 | P1 | P2 |
|---|---|---|---|---|---|---|---|
| Starting with ICE | From idling speed, then full load | "Idling" Minimal losses | In function | Closed (pressureless) | Closed Pressure applied | On | Off |
| Electric starting | Not in operation | From xxx rpm, then full load of engine | In function | Open (pressure applied) | Close at xxx rpm | On | On up to approx. 1000 rpm |
| Starting ICE/electric | From idling speed with partial load | Partial load of engine | In function | Closed | Closed | On | On up to approx. 1000 rpm |
| Braking (storing) electric | Optional Not in operation | Generator | Minimum demand for power in function | Optionally open | Closed | On | On from approx. 1000 rpm |
| Duration of braking ICE/retarder | Drag operation/optional engine brake | Generator/braking resistance, engine brake optional | In function Full power | Closed | Closed | On | On from approx. 1000 rpm |
| Duration of braking ICE/retarder | Drag operation/optional engine brake | Idle | In function Full power | Closed | Closed | On | On from approx. 1000 rpm |
| Idling ICE off | Not in operation | Engine operation Xxx rpm | Minimum demand for power in function | Open | Open | On | Off |
| Restart ICE with electric machine | Drag run-up to xxx rpm with C1 | Idling of engine at xxx rpm Loading from closing of C1 | Minimum demand for power in function | Close at xxx rpm | Open | On | Switch on |
| Starting of ICE on start-up | Drag run-up to xxx rpm with C1 | Run up of engine unloaded up to xxx rpm | Minimum demand for power | Close at xxx rpm | Open | On | Off |
| Starting of ICE during travel | Drag run-up with C1 | Engine operation Torque compensation for synchronization C1 | In function | Close | Open | On | Off |

E = Electric machine
ICE = Internal combustion engine
AU = Ancillary unit
C1 = First clutch (closed pressureless)
Xxx = Speed value to be set C2 = Second clutch in automatic transmission (open pressureless)
P1 = First pressure oil pump in automatic transmission
P2 = Pressure oil pump in automatic housing that can be activated

Fig. 5

| Operating state | ICE | E | AU | C1 (Jaw) | C2 | P1 | P2 |
|---|---|---|---|---|---|---|---|
| Starting with ICE | From idling speed, then full load | "Idling" Minimal losses | In function | Closed (pressureless) | Closed Pressure applied | On | Off |
| Electric starting | Not in operation | From xxx rpm, then full load of engine | In function | Open (pressure applied) | Close at xxx rpm | On | On up to approx. 1000 rpm |
| Starting ICE/electric | From idling speed with partial load | Partial load of engine | In function | Closed | Closed | On | On up to approx. 1000 rpm |
| Braking (storing) electric | Optional Not in operation | Generator | Minimum demand for power in function | Optionally open | Closed | On | On from approx. 1000 rpm |
| Duration of braking ICE/retarder | Drag operation/optional engine brake | Generator/braking resistance, engine brake optional | In function Full power | Closed | Closed | On | On from approx. 1000 rpm |
| Duration of braking ICE/retarder | Drag operation/optional engine brake | Idle | In function Full power | Closed | Closed | On | On from approx. 1000 rpm |
| Idling ICE off | Not in operation | Engine operation Xxx rpm | Minimum demand for power in function | Open | Open | On | On from approx. 1000 rpm |
| Restart ICE with electric machine | Starting with electric machine | Loading with starting process | Minimum demand for power in function | Close at 0 rpm | Open | On | Switch on |
| Starting of ICE on start-up | Starting with electric machine | Loading with starting process | Minimum demand for power | Close at 0 rpm | Open | On | Off |
| Starting of ICE during travel | Starting with electric machine, run-up to synchronization speed AT | Braking until standstill, loading with starting process, run-up to synchronization speed | In function | Close at 0 rpm | Open, close after starting process | On | On up to approx. 1000 rpm |

E = Electric machine
ICE = Internal combustion engine
AU = Ancillary unit
C1 = First clutch (closed pressureless)
Xxx = Speed value to be set C2 = Second clutch in automatic transmission (open pressureless)
P1 = First pressure oil pump in automatic transmission
P2 = Pressure oil pump in automatic housing that can be activated

Fig. 6

MOTOR VEHICLE POWER TRAIN

This is a U.S. national phase application which is based on, and claims priority from, PCT application Serial No. PCT/EP2009/007323, filed Oct. 12, 2009, which claims priority from foreign application Serial No. 102008052288.0, filed Oct. 18, 2008, in Germany.

The present invention relates to a motor vehicle power train, especially for heavy-duty commercial vehicles for the transport of passengers and goods such as city busses.

Hybrid-driven commercial vehicles have become known recently whose power train substantially comprises a main drive engine arranged as an internal combustion engine, an electric motor and a transmission. The internal combustion engine, the electric motor and the transmission are conventionally arranged behind one another in the direction of power transmission from the output shaft of the internal combustion engine to a transmission output shaft. The internal combustion engine and the electric motor can conventionally be brought into a driving connection with the transmission input shaft for driving the vehicle wheels, so that they can be driven either by the internal combustion engine, the electric motor alone or by both together. Any ancillary units arranged in the power train are driven especially exclusively by the internal combustion engine. Such an arrangement is known as a parallel hybrid.

Modern parallel hybrid drives comprise a so-called automatic start/stop system which places the internal combustion engine out of operation for the duration of an operating state of the vehicle which was characterized conventionally by low power output of the internal combustion engine. Such a system is used for example in passenger cars, wherein the engine is automatically switched off during a wait at a traffic stop and is automatically put back into operation by actuating a clutch or accelerator pedal by the driver.

The saving of fuel by means of an automatic start/stop system will soon reach its limits especially in the field of commercial vehicles, especially when ancillary units need to be operated further during the standstill of the vehicle, which ancillary units maintain important functions of the commercial vehicle such as the drive of compressors for the compressor unit or air-conditioning system or generators for the generation of current. On the other hand, a number of special vehicles (e.g. garbage trucks) are known which comprise ancillary units that have high power consumption especially during standstill (e.g. devices for emptying garbage cans or presses). In such a case, the ancillary units of such vehicles are operated exclusively via the internal combustion engine during standstill of the vehicle, even when they have a parallel hybrid drive. Although efforts have been made recently to drive ancillary units such as air-conditioning compressors for passenger cars by means of separate electric motors when the internal combustion engine is switched off, such drives are complex in their configuration, require a large amount of space and are heavy and expensive to produce.

The present invention is based on the object of providing a motor vehicle power train which avoids, the disadvantages of the state of the art. At the same time, fuel savings should be as high as possible, production should be as cost-effective as possible and complex constructions should be avoided as far as possible. In particular, the full functionality of the vehicle with its ancillary units shall be ensured in every operating state of the vehicle (traction, standstill), irrespective of whether or not the internal combustion engine is in operation.

This object is achieved by a motor vehicle power train according to the independent claim. The dependent claims represent preferred embodiments of the invention.

A motor vehicle power train in accordance with the invention, especially for heavy-duty commercial vehicles, comprises a main drive engine, especially an internal combustion engine such as a diesel or petrol engine, comprising an output shaft for driving the drive wheels of the motor vehicle, and an electric motor, comprising a rotor and a stator, also for the drive of the drive wheels. Furthermore, an automatic transmission is provided, comprising a plurality of selectively settable drive connections for the implementation of gears, and a transmission input shaft and a transmission output shaft in order to selectively set a plurality of gear ratios between the transmission input shaft and the transmission output shaft. The rotor of the electric motor is disposed in a drive connection between the output shaft of the main drive engine and the transmission input shaft, and can be decoupled from the output shaft by means of a clutch. At least one ancillary unit is further provided which can be driven by the main drive engine. In accordance with the invention, the rotor of the electric motor comprises an exterior drive having a gearing or friction surface which has a driving connection to the at least one ancillary unit in order to drive the same by means of the rotor.

As a result, the electric motor can be used in addition or alternatively to the main drive engine for driving one ancillary unit, or a plurality thereof, especially irrespective of whether the vehicle is driving or at a standstill. In other words, the at least one ancillary unit is in a drive connection with the main drive engine and/or the electric motor, or can be switched to such a connection, in order to transfer drive power selectively or simultaneously from the main drive engine and electric motor to the ancillary unit. The drive energy necessary for the electric drive is provided for example by respective storage means for electric power arranged in the vehicle. They can be storage batteries such as nickel or lithium batteries, high-power or double-layer capacitors (SuperCaps). The electric storage means can be charged by means of external voltage sources such as overhead wires or the conventional mains network. In the case of charging via the mains network, the electric storage means is free from a permanent connection with the power source, so that it is connected with the electric storage means merely for the duration of charging, with the vehicle being at a standstill (plug-in hybrid). Instead of the electric storage means, the electric power for driving the electric motor, or a plurality thereof, of the motor vehicle power train can be provided exclusively via the overhead wire (e.g. trolleybus). A recuperation of braking energy by the electric motor of the motor vehicle power train is possible, wherein the same is arranged in such a way that it can also be operated as a generator in order to retard the drive wheels of the motor vehicle and to charge the electric storage means simultaneously (electric retarder).

An alternative drive such as an electric motor, especially as a part of a fuel-cell drive, can be provided as a main drive motor of the motor vehicle power train in accordance with the invention. The electric motor can also be arranged as a transversal flux machine in such a case or when providing an internal combustion engine as a main drive engine, as described for example in DE 198 58 304.

When providing an internal combustion engine as the main drive motor, the latter can be arranged in smaller dimension. A higher efficiency and thus higher fuel savings can be achieved despite the output of a lower torque and reduction in the weight and need for space or the displacement because the internal combustion engine is supported in unfavorable operating points by connecting the electric motor to the power train (downsizing).

The transmission comprises a transmission housing, wherein the transmission input shaft is arranged on the first face side and the transmission output shaft is especially arranged on its second face side which is arranged opposite of the first face side, and an auxiliary output module is connected on the first face side on the transmission housing, comprising a housing which encloses the electric motor, the clutch and an auxiliary output shaft which protrudes from the housing for example, with the auxiliary output shaft being in a drive connection with the rotor and especially bearing a pinion which meshes with the external gearing of the rotor either indirectly or via an interposed gearwheel and drives the ancillary unit or a rotor of the ancillary unit, and especially carries the ancillary unit.

As seen in the direction of power transmission from the main drive engine to the transmission, the auxiliary output module is arranged behind the main drive engine and before the transmission, especially the traction drive transmission, in the motor vehicle power train. A plurality of ancillary units can be provided in the auxiliary output module which are directly or indirectly in drive connection with the rotor for power splitting, or can be brought to the rotor for power splitting. Indirectly means that the ancillary units are driven via a plurality of pinions which mesh directly or indirectly with the rotor of the electric motor, with the ancillary units being arranged especially behind one another as seen in the direction of power flow.

The combined arrangement of electric motor, clutch and auxiliary output with the associated ancillary units in a common housing enables a compact, space-saving and modular configuration of the auxiliary output module. Weight and costs are additionally saved as a result of this configuration. It is thus also possible to retrofit the auxiliary output module in a motor vehicle power train of an existing vehicle. Instead of the automatic transmission it can also be arranged as a manual or automated gearbox.

When the motor vehicle power train in accordance with the invention is arranged for example in such a way that the electric motor is supplied with current at least temporarily via an overhead wire, an insulation of the electric motor from the remaining vehicle power train can be provided in addition. For example, the housing of the transmission and the auxiliary output module can be separated from one another via suitable insulators. It is also possible to electrically insulate the individual ancillary units among one another or in relation to the rotor, with pinions and gearwheels made of non-conductive materials (e.g. plastic) being used in this case for example. It can also be provided to insulate the auxiliary output module in relation to the internal combustion engine and a flywheel or torsional vibration damper downstream of the internal combustion engine. There are a large number of possibilities with respect to insulation which lie in the field of activities of the person skilled in the art, which is why the precise configuration will be not be discussed herein.

The automatic transmission can advantageously be a differential converter transmission or additionally comprise a TRILOK torque converter.

Preferably, the rotor of the electric motor is in a drive connection, especially a permanent drive connection with at least one pump, especially an oil pump and/or a water pump. Such a pump can similarly be housed as an ancillary unit in the auxiliary output module and ensures for example the recirculation of a cooling medium in a cooling circuit for cooling the ancillary units and/or the electric motor and/or the main drive engine and other especially electronic components and/or exhaust systems. In the latter case, the medium can flow through a radiator provided in an exhaust-gas recirculation system or a charge-air intercooler when providing at least one turbocharger with associated compressor for the discharge of heat.

Preferably, the at least one pump is driven via the transmission input shaft, with a second clutch being provided between the transmission input shaft and the plurality of selectively settable drive connections for the implementation of gears. The settable drive connections are implemented substantially by sets of intermediate gears and couplings (intermediate transmission). For example, the pump can be connected when needed by means of a shiftable clutch which can be arranged between the pump and the transmission shaft, with the intermediate transmission being arranged in such a way that it supplies a speed-increasing ratio, so that the pump is always driven at a higher speed than the transmission input shaft (gear ratio higher than 2.5).

The invention will be explained below reference to embodiments and the enclosed drawings by way of example, wherein:

FIG. 5 shows a table which shows the functions of the components in accordance with the invention depending on the operating state of the motor vehicle power train in accordance with the invention;

FIG. 6 shows a view according to FIG. 5, but the first clutch is arranged as a jaw coupling.

Figure 1:
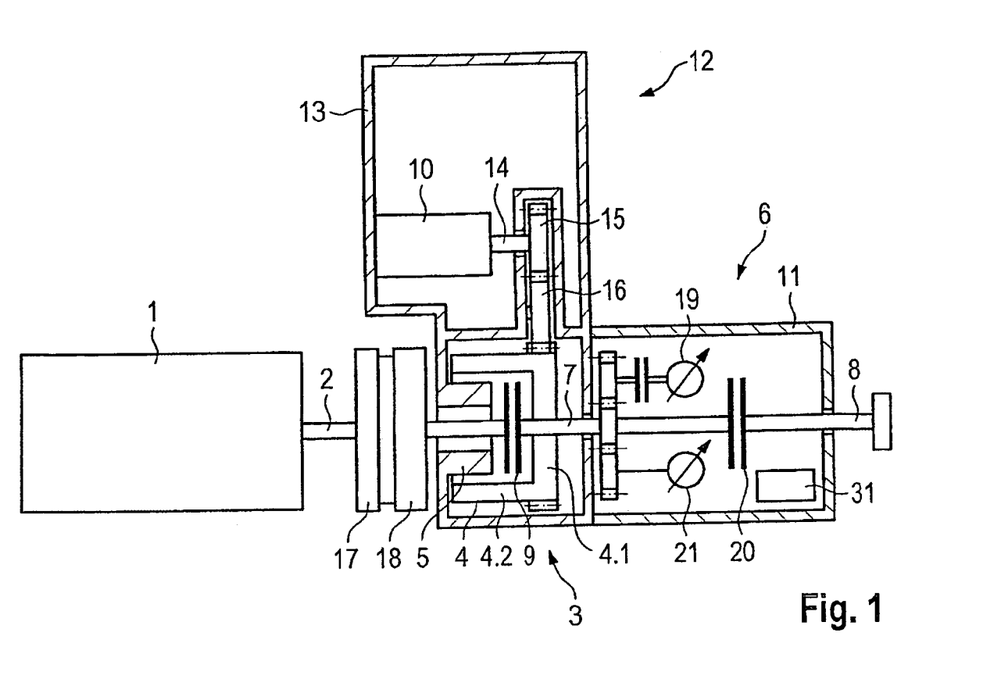
FIG. 1 shows a schematic view of the first embodiment of a motor vehicle power train in accordance with the invention.

FIG. 1 shows a schematic view of a first embodiment of a motor vehicle power train in accordance with the invention. The following components are switched behind one another as seen in the direction of power transmission: a main drive engine 1, an output shaft 2, a flywheel 17, a torsional vibration damper 18, a first clutch 9, an electric motor 3 and a transmission 6, comprising a first and second pump 19, 21, a second clutch 20 and a transmission output shaft 8. In the present case, the main drive engine 1 is arranged as a combustion engine and drives the transmission input shaft 7, the transmission output shaft 8 of the transmission 6 in a first operating state with engaged first clutch 9 as well as the drive wheels (not shown) of the vehicle (first power transmission branch) via a cardan shaft (also not shown) which is in a drive connection with the transmission output shaft 8. At the same time, drive power is transmitted via the rotor 4 of the electric motor 3 which revolves in a torque-proof manner with the drive shaft 2 to an ancillary unit 10 for its drive (second power transmission branch). For this purpose, the rotor 4 comprises an external drive especially on its outside circumference which can be arranged in the form of a gearwheel, belt or chain drive. The external drive is arranged for this purpose as a gearing, with the rotor 4 comprising an external gearing which meshes with an interposed gearwheel 16 and a pinion 15 and thus drives the ancillary unit 10 via the pinion 15 and an auxiliary output shaft 14 which is connected with the same in a torque-proof manner. A plurality of interposed gearwheels 16 can also mesh with the pinion 15 by forming a gear step with the external gearing of the rotor 4 in order to drive a plurality of ancillary units 10 via a plurality of auxiliary output shafts. As a result, a plurality of ancillary units 10 are driven, which units are in drive connection with the rotor 4 indirectly and especially permanently via the especially only external gearing. It would further be possible to disconnect individual or all ancillary units 10 from this drive connection either simultaneously or selectively by providing at least one clutch.

It would be possible alternatively to arrange the external gearing on the transmission input shaft 7 behind the rotor 4 in the direction of power flow.

In a second operating state, the first clutch 9 is disengaged so that the drive connection between the output shaft 2 and the transmission input shaft 7 is interrupted, with especially the main drive engine 1 being at a standstill. This operating state usually occurs when activating an automatic start/stop system during standstill of the motor vehicle. The electric motor is supplied with energy via a connecting line (not shown) with a storage means for electric power (also not shown) or an external power source. In this operating state, only the electric motor 3 ensures the drive of the transmission input shaft 7 and also, when the second clutch 20 is closed, that drive power is transferred via the transmission output shaft 8 to the drive wheels (not shown). At the same time, the at least one ancillary unit 10 is driven at least indirectly via the rotor 4 in a second power transmission branch, as described above.

The first clutch 9, the electric motor 3 comprising the rotor 4 and stator 5, the interposed gearwheel 16 and the pinion 15 and the auxiliary output shaft 14 and the at least one ancillary unit 10 are arranged in this case in a common housing 13. In the present case, the part of the housing 13 enclosing the electric motor 3 is arranged between the transmission 6 and the torsional vibration damper 18, with this part of the housing 13 facing with its face side the face side with the transmission input shaft 7 of transmission 6. The part of housing 13 comprising one ancillary unit 10, or a plurality thereof, is arranged adjacent to the transmission 6 as seen in the axial direction, which means that the housing 13 extends axially in the direction towards the main drive engine 1. The housing 13 could also extend axially in the direction of the housing 6 towards the transmission output shaft 8. Other arrangements are also possible, especially such in which the auxiliary output shaft 14 extends at an angle to the transmission input shaft 7.

As is shown in FIG. 1, the first clutch 9 is arranged between an axial end of the stator 5 and a radial section 4.1 of the rotor 4. An axial section 4.2 of rotor 4 encloses at least a part of the stator 5 and the first clutch 9. The stator 5 can be arranged in a torsion-proof manner and especially in an integral manner with the housing 13. It has the shape of a circular ring in the present case and forms a lead-through for the output shaft 2, with the lead-through enclosing the latter in a radial fashion. The first clutch 9 can be connected to an oil circuit of transmission 6 for its actuation or can be actuated in another manner, e.g. in a pneumatic, electric, electromagnetic or mechanical way. In the case of hydraulic actuation of the first clutch 9 by the oil circuit of the transmission 6, the clutch can be arranged in such a way that it is pressed in without pressurization with gear oil, i.e. it is closed, and will open under pressurization.

A further second clutch 20 can be provided in addition to the first clutch 9 especially in the region of the transmission 6. It is provided downstream of the electric motor 3 in the direction of power flow, with a first clutch part being connected in a torque-proof manner with the transmission input shaft 7 and a second clutch part in a torque-proof manner with the transmission output shaft 8.

Furthermore, the first pump 19 is associated here to the transmission 6 and housed in the transmission housing 11. It is especially always connected in a torque-proof manner or can be coupled in a torque-proof manner with the transmission input shaft 7. It would also be possible to house the same in the auxiliary output module 12 and especially within the housing 13 and to drive the same via the rotor 4. Pump 19 can also be driven by a separate electric motor. It is used essentially to ensure the supply with pressure oil for the transmission 6 and/or the ancillary units 10 already at low speeds of the transmission input shaft 7. When the transmission 6 is arranged as a torque converter transmission for example, pump 19 is used for generating an oil volume flow with which the hydrodynamic component of the torque converter can be driven in order to change the gear of the transmission, to bridge the torque converter or to couple the transmission without slippage with power train. Pump 19 can be switched via a coupling in a selective manner into the drive connection with the transmission input shaft 7, as shown here. An intermediate gear can also be provided by means of which the speed of the pump impeller of pump 19 can be transmitted depending on the speed of the transmission input shaft 7. In addition to pump 19, a further oil pump 21 can be provided which is especially in continual drive connection with the transmission shaft 7 and which ensures a continual oil flow in the transmission 6, irrespective of whether the main drive engine 1 or the electric motor 3 supplies the drive power. The two pumps 19, 21 can be switched in parallel with respect to each other for example.

Figure 2:
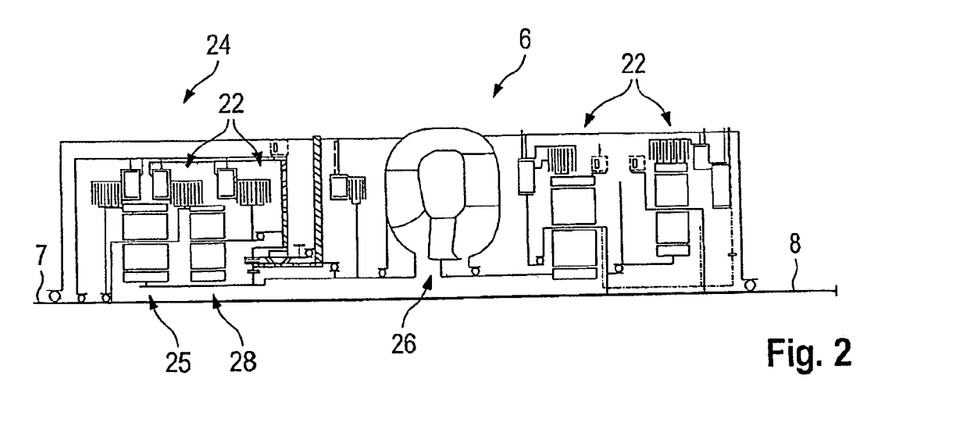
FIGS. 2 to 4 show an embodiment of an automated transmission (direct converter or TRILOK torque converter) of a motor vehicle power train in accordance with the invention.
Figure 3:
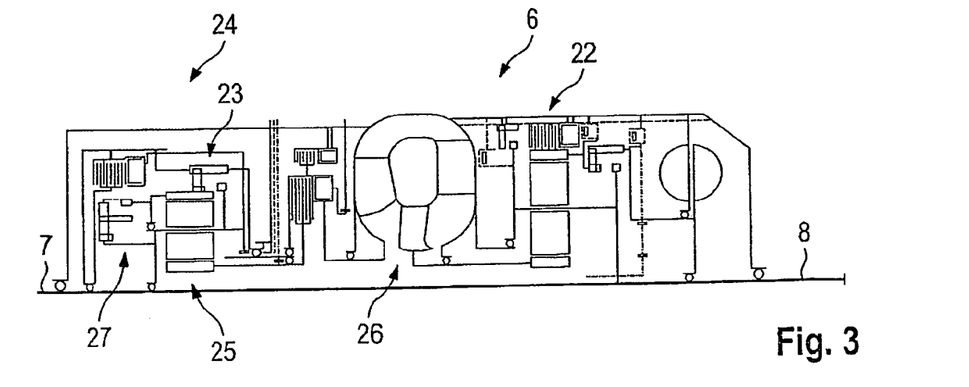
Figure 4:
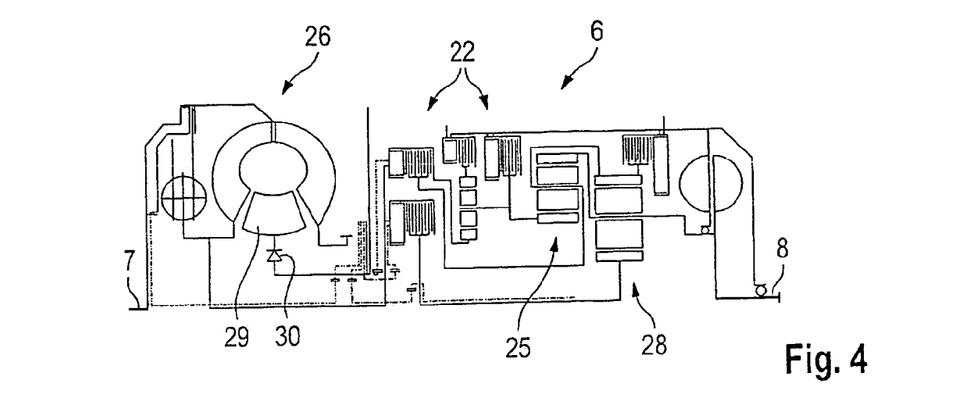

FIGS. 2 to 4 show a special embodiment of the transmission 6 of FIG. 1. The transmission 6 is arranged as a direct converter transmission in FIGS. 2 and 3. Such transmissions, especially for the use in vehicles, are known in a large number of arrangements. They work fully automatically with a counter-rotating converter which is used both for acceleration during the driving off process and for realizing the delay of the vehicle, which means in braking operation. It is possible to drive with such a transmission over a longer period of time in an infinitely variable manner, which means without frequent shifting. As is shown in FIGS. 2 and 3, a differential gear 24 is arranged at first as seen in the direction of power transmission from the transmission input shaft 7 to the transmission output shaft 8, by means of which drive power can be transmitted from the output shaft 2 (not shown) of the main drive engine 1 simultaneously via the hydrodynamic converter 26 arranged further back in the transmission 6 and also via a purely mechanical power branch arranged parallel to the hydrodynamic converter 26 to the transmission output shaft 8 via various gear steps 22, e.g. comprising planetary gears and multiple disk clutches, for setting forward gears and at least one reversing gear. For example, the second clutch 20 (FIG. 1) can be realized as a multiple disk clutch. In the present case, the differential gear 24 comprises two planetary gear sets 25, 28.

FIG. 3 shows an advantageous further development of the transmission 6 of FIG. 2. Instead of the two planetary gear sets 25, 28, only one planetary gear set 25 is provided in the region of the transmission input shaft 7. Merely the coupling structure of the planetary gear set 25 is changed in contrast to FIG. 2 instead of the changeover from the one planetary gear set 25 to the other planetary gear set 28. In the present case, the transmission 6 comprises two jaw couplings 23, 27 for this purpose. By respective shifting of the jaw couplings 23, 27, a power branch extending parallel to this one planetary gear set 25 is not used for torque transmission in one gear step of the planetary gear set 25. Instead, the only the friction moment of a multiple disk clutch of the respective gear step 22 is applied which promotes a rapid shifting process. The jaw couplings 23, 27 can be operated and triggered like the two clutches 9, 20. Such an arrangement allows providing the transmission 6 with a more compact configuration.

FIG. 4 shows a transmission 6 which is arranged as a known TRILOK torque converter. The same components are designated with the same reference numerals as in FIGS. 2 and 3. The converter 26 comprises a selectively fixable guide wheel 29, cf. the parking brake or the clutch 30 which can be arranged as a multiple-disk packet clutch. An electric motor in accordance with the invention can be provided instead of the converter 26 which can be arranged as described above.

FIG. 5 shows a table in which the functions of the motor vehicle power train in accordance with the invention and its components are shown depending on the operating state of the motor vehicle power train. All components in accordance with the invention, especially the embodiments described in FIGS. 1 to 4, can be combined with one another. The operating states will be explained below in closer detail by reference to FIGS. 1 to 4:

Starting with the Internal Combustion Engine

The starting process occurs exclusively here by means of the main drive (which is the internal combustion engine here) and thus without activating the electric motor 3. Such a starting process will be considered when the energy storage means is empty for example or when an external power source is not available. It corresponds to the starting process of a motor vehicle with conventional power train, which means without a hybrid drive. The speed of the internal combustion engine rises gradually during the starting process from idle speed up to full load. The rotor 4 of the electric motor rotates together with the transmission input shaft 7 when the first clutch 9 is closed. The at least one ancillary unit 10 is driven via rotor 4. Since the second clutch 20 is engaged, the drive power is transmitted via the transmission output shaft 8 onto the wheels. The second pump 21 which is in continual drive connection with the transmission input shaft 7 is thus driven. Pump 19 is switched off in this case, e.g. by opening the clutch associated with the same.

Electric Starting

The internal combustion engine is stopped in this case, the first clutch 9 is opened. In this case, only electric motor 3 is driven from the energy storage means or by means of the external power supply. It revolves starting from an initial speed ("idle speed") which can be set up to full-load speed. The ancillary units 10 are driven by the rotor 4. The second clutch 20 is closed from a certain speed, through which the starting process is initiated and the vehicle accelerates slowly. The pump 19 is switched on during the starting process, but is switched off afterwards at approx. 1,000 rpm. Since the electric motor 3 already revolves with a specific speed in order to drive the ancillary units, the full torque can already be used when initiating the starting process. For this reason, a transversal flux machine can be used instead of the electric motor 3. A run-up apparatus for accelerating the rotor 4 to nominal speed can be omitted. When the transmission 6 comprises a torque converter, as described above, the comfort during the starting process is improved. The first pump 19 is activated in order to achieve a respective efficiency. It supplies the necessary oil volume flow in order to achieve a bridging of the torque converter already at low speeds when necessary.

Starting with Internal Combustion Engine and Electric Motor

The electric motor 3 and the internal combustion engine run with partial load. The two clutches 9, 20 are closed, so that the ancillary units and the entire vehicle are driven. Pump 19 is switched as in "electric starting".

Braking (Storing, Electric)

The clutch 9 is selectively opened, and the internal combustion engine is selectively out of operation. As a result, the drag losses of the internal combustion engine are thus avoided, so that a higher level of kinetic energy is maintained, which is used for charging the electric storage means, so that the total efficiency of the motor vehicle power train increases. The electric motor 3 thus acts as a generator with closed clutch 20, with the electric storage means of the vehicle being charged. The ancillary units are in function, with the same preferably having a minimal need for power. The pump 19 is driven as in "starting with internal combustion engine and electric motor".

Permanent Braking with Internal Combustion Engine and Electric

The two clutches 9, 20 are closed. The pumps 19, 21 work as in electric storage operation. The internal combustion engine is a drag operation. If the vehicle comprises an engine braking device, it can be activated selectively. The electric motor is in generator operation. Excessive energy which cannot be stored in the electric storage means is converted into heat in a cooled resistor. Alternatively, the internal combustion engine and especially the output shaft 2 can be retarded by means of the electric motor 3 and especially by its driving. The ancillary units are in function. In particular, they can operate at full power.

Permanent Braking with Internal Combustion Engine and Retarder

This operating state differs from "permanent braking with internal combustion engine and electric" merely by the fact that electric motor 3 is idling. The vehicle is equipped with a hydrodynamic retarder or any other permanent brake by which the vehicle is retarded in addition.

Idling, Internal Combustion Engine Off

This operating state describes the standstill of the motor vehicle with the internal combustion engine switched off. The two clutches 9, 20 are consequently opened. The electric motor 3 runs in motor operation with an idling speed, the ancillary units are in function, but require a minimum power need. The advantage of switching off the internal combustion engine is in addition to saving fuel that the exhaust gas purification system, especially in the case of diesel engines equipped with a diesel particulate filter, will not cool off during idling and thus works more efficiently in vehicles such as public service busses with marked stop/go operation. The first pump 19 is out of operation.

Restart of the Internal Combustion Engine with Electric Motor

Both clutches 9, 20 are opened in the initial state. The ancillary units are in function, but require a minimum power need. The electric motor 3 is idling, but revolves with a certain speed. When the first clutch 9 is closed, the internal combustion engine is dragged up to a starting speed, with the electric motor 3 being loaded increasingly from a virtually load-free state before the engagement. The torque of the electric motor 3 can be controlled in such a way that the speed of the electric machine will change only insignificantly, so that the ancillary units 10 can further be operated at constant speed. The automatic transmission remains ready for starting by the active speed of the electric motor. The pump 19 can be activated when required at low speeds of the ancillary units in order to avoid losses, so that the full function of the transmission 6 is ensured.

Starting of Internal Combustion Engine During Start-Up

The ancillary units 10 act as in the operating state "restart of internal combustion engine with electric motor". Both clutches 9, 20 are opened at first. The electric motor 2 is run up in a virtually load-free manner up to a specific speed. The internal combustion engine is dragged up by closing the first clutch 9 and starts in idle speed. A conventional starter can thus be omitted. The electric machine 3 can also be arranged here as a transversal flux machine. In addition, the pump 19 can be activated already at low speeds.

Starting of Internal Combustion Engine During Travel

The restarting during travel from the electric storage means ("cruising operation") occurs in analogy to "restarting". The speed or torque of the electric motor 3 can be controlled in such a way that it is synchronized with that of the internal combustion engine during dragging up. Unpleasant jerky movements for the driver are thus avoided.

FIG. 6 substantially describes the same operating states as in FIG. 5. The transmission 6 is arranged as a TRILOK torque converter according to FIG. 4 however. The operating states are identical with FIG. 5 with the exception of the last three, so that they will not be discussed here.

Restart of Internal Combustion Engine with Electric Motor

The electric motor is stopped briefly at first, so that the first clutch 9 which is arranged as a jaw coupling can be closed at standstill. After the engagement of the jaw coupling, the internal combustion engine is started jointly with the electric motor. The loading of the electric motor rises with the starting process. In addition, the pump 19 can be switched on for ensuring the oil supply during standstill. Alternatively or in addition, a storage means 31 (FIG. 1) which can be housed in transmission 6 for example can supply the transmission and the jaw coupling with pressure oil for their actuation. The ancillary units are driven with minimal need for power during the starting process.

Starting of Internal Combustion Engine During Start-Up

This operating state corresponds substantially to the "restart of internal combustion engine with electric motor", with pump 19 being switched off.

Starting of Internal Combustion Engine During Travel

The electric motor 3 is braked until standstill, so that the jaw coupling is engaged at speed 0 and can be closed. The second clutch 20 is opened during the starting process. After closing the first clutch 9, the internal combustion engine is run up together with the electric motor 3 until a synchronization speed has been reached. The second clutch 20 is closed after the starting process. The first pump 19 switches off from approx. 1,000 rpm.

LIST OF REFERENCE NUMERALS

1 Main drive engine
2 Output shaft
3 Electric motor
4 Rotor
5 Stator
6 Transmission
7 Transmission input shaft
8 Transmission output shaft
9 Clutch
10 Ancillary unit
11 Transmission housing
12 Auxiliary output module
13 Housing
14 Auxiliary output shaft
15 Pinion
16 Gearwheel
17 Flywheel.
18 Torsional vibration damper
19 Pump
20 Clutch
21 Pump
22 Gear step
23 Jaw coupling
24 Differential gear
25 Planetary gear set
26 Hydrodynamic converter
27 Jaw coupling
28 Planetary gear set
29 Guide wheel
30 Parking brake
31 Storage means

The invention claimed is:

1. A motor vehicle power train comprising:
a main drive engine, comprising an output shaft for driving the drive wheels of the motor vehicle;
an electric motor, comprising a rotor and a stator, also for driving the drive wheels of the motor vehicle;
an automatic transmission, automatic gearbox or manual gearbox, comprising a plurality of selectively settable drive connections for the implementation of gears, and a transmission input shaft and a transmission output shaft in order to selectively set a plurality of gear ratios between the transmission input shaft and the transmission output shaft, with
the rotor of the electric motor being disposed in a drive connection between the output shaft of the main drive engine and the transmission input shaft, and can be decoupled from the output shaft of the main drive engine by means of a first clutch;
at least one ancillary unit which can be driven by the main drive engine;
the rotor of the electric motor comprises an exterior drive having a gearing or friction surface which has a driving connection to the at least one ancillary unit in order to drive the at least one ancillary unit by means of the rotor, characterized in that
the transmission comprises a transmission housing, with the transmission input shaft being arranged on a first face side of the transmission housing and the transmission output shaft being arranged on a second face side of the transmission housing which is arranged opposite of the first face side, and
an auxiliary output module is connected on the first face side to the transmission housing, comprising a housing which encloses the electric motor, the first clutch and an auxiliary output shaft which protrudes from the housing of the auxiliary output module, with
the auxiliary output shaft being in a drive connection with the rotor and bearing a pinion which meshes with an external gearing of the rotor either indirectly or via an interposed gearwheel and drives the ancillary unit or a rotor of the ancillary unit, and carries the ancillary unit.

2. A motor vehicle power train according to claim 1, characterized in that a flywheel and a torsional vibration damper are arranged in the drive connection between the first clutch and the output shaft of the internal combustion engine.

3. A motor vehicle power train according to claim 2, characterized in that the rotor of the electric motor is in a pump drive connection with at least one pump, an oil pump and/or water pump.

4. A motor vehicle power train according to claim 3, characterized in that the at least one pump is driven via the transmission input shaft, and a second clutch is provided between the transmission input shaft and the plurality of selectively settable drive connections for the implementation of gears.

5. A motor vehicle power train according to claim 4, characterized in that the output shaft of the internal combustion engine, the first clutch, the rotor, the transmission input shaft and the transmission output shaft are arranged in alignment with one another.

6. A motor vehicle power train according to claim 4, characterized in that the stator of the electric motor is mounted in a stationary manner in the housing of the auxiliary output module or is arranged in an integral manner with the same.

7. A motor vehicle power train according to claim 4, characterized in that the output shaft of the internal combustion engine, the first clutch, the rotor, the transmission input shaft and the transmission output shaft are arranged in alignment with one another.

8. A motor vehicle power train according to claim 3, characterized in that the stator of the electric motor is mounted in a stationary manner in the housing of the auxiliary output module or is arranged in an integral manner with the same.

9. A motor vehicle power train according to claim 2, characterized in that the output shaft of the internal combustion engine, the first clutch, the rotor, the transmission input shaft and the transmission output shaft are arranged in alignment with one another.

10. A motor vehicle power train according to claim 9, characterized in that the stator of the electric motor is mounted in a stationary manner in the housing of the auxiliary output module or is arranged in an integral manner with the same.

11. A motor vehicle power train according to claim 2, characterized in that the stator of the electric motor is mounted in a stationary manner in the housing of the auxiliary output module or is arranged in an integral manner with the same.

12. A motor vehicle power train according to claim 1, characterized in that the rotor of the electric motor is in a pump drive connection with at least one pump, an oil pump and/or water pump.

13. A motor vehicle power train, according to claim 12, characterized in that the at least one pump is driven via the transmission input shaft, and a second clutch is provided between the transmission input shaft and the plurality of selectively settable drive connections for the implementation of gears.

14. A motor vehicle power train according to claim 13, characterized in that the output shaft of the internal combustion engine, the first clutch, the rotor, the transmission input shaft and the transmission output shaft are arranged in alignment with one another.

15. A motor vehicle power train according to claim 13, characterized in that the stator of the electric motor is mounted in a stationary manner in the housing of the auxiliary output module or is arranged in an integral manner with the same.

16. A motor vehicle power train according to claim 3, characterized in that the output shaft of the internal combustion engine, the first clutch, the rotor, the transmission input shaft and the transmission output shaft are arranged in alignment with one another.

17. A motor vehicle power train according to claim 12, characterized in that the stator of the electric motor is mounted in a stationary manner in the housing of the auxiliary output module or is arranged in an integral manner with the same.

18. A motor vehicle power train according to claim 1, characterized in that the output shaft of the internal combustion engine, the first clutch, the rotor, the transmission input shaft and the transmission output shaft are arranged in alignment with one another.

19. A motor vehicle power train according to claim 18, characterized in that the stator of the electric motor is mounted in a stationary manner in the housing of the auxiliary output module or is arranged in an integral manner with the same.

20. A motor vehicle power train according to claim 1, characterized in that the stator of the electric motor is mounted in a stationary manner in the housing of the auxiliary output module or is arranged in an integral manner with the same.

* * * * *